United States Patent [19]

Shiao

[11] Patent Number: 5,389,371
[45] Date of Patent: Feb. 14, 1995

[54] ARECA FOOD ADDITIVES AND ITS FOODS

[76] Inventor: Shin Jen Shiao, 1001 Tahsueh Road, Institute of Applied Chemistry, Chiao Tung University, Hsinchu 300, Taiwan, Prov. of China

[21] Appl. No.: 6,946

[22] Filed: Jan. 21, 1993

[30] Foreign Application Priority Data

Feb. 13, 1992 [PH] Philippines .............................. 43923

[51] Int. Cl.⁶ ........................ A61K 35/78; A23L 1/28; A23J 1/00
[52] U.S. Cl. ................................ 424/195.1; 426/655; 426/656
[58] Field of Search ..................... 424/195.1; 426/655, 426/656

[56] References Cited

PUBLICATIONS

Blue Ribbon Apple Fruit Pie, Interstate Brands Corporation, 1987.

*Primary Examiner*—John W. Rollins
*Assistant Examiner*—Howard C. Lee
*Attorney, Agent, or Firm*—Michael D. Bednarek

[57] ABSTRACT

This invention relates to areca food additives, especially, to additives for areca quids and foods containing areca component, and their preparation methods. High alkaline lime always exists in conventional areca food additive. Many problems consequently result such as oral cancer and the polluting of the environment by the spitting of a bright red liquid. A series of eatable neutral calcium salts of organic acid and compounds containing at least one of the following functional groups selected from the group consisting of $-NH_2$, $=NH$, $\equiv N$, $-NH-$, $-CONH-$, $-HCO-$, $-CO-$, $-COOR-$, $-S-$, and their salts were invented to replace lime. The taste of astringent and harms caused by the polyphenolic compounds of areca quid could be completely improved. The disease of quid chewer would be decreased and the problem of environmental pollution would be improved.

10 Claims, No Drawings

ARECA FOOD ADDITIVES AND ITS FOODS

BACKGROUND OF THE INVENTION

Areca quid chewing is an almost universal indulgence in many regions of southeastern Asia, and in small and large islands adjacent to the coast, and in the Southwest Pacific area.

The preparation of the areca quid is fairly uniform in this part of the world, with variations existing only in the compositions of areca food additives. Lime is the most important component of areca food additive. The other constituent may have been selected from the group consisting of gambit, tobacco, coffee, cocoa, Chinese herbs, and modifier such as sweetener, perfume, preserver, stabilizer, color pigment and fillers. The areca food additive is usually in the form of paste.

The preparation of traditional areca quid has been done in several ways.

1. Chewing is practiced by first inserting a piece of the areca seed pulp in the mouth. This is masticated for a few seconds, followed by with the betel leaf or betel fruit, with a generous helping of lime, being taken; a large wad then results, in which a long-continued indulgence of the tissues in the oral cavity become stained bright red. The mixture induces intense salivation. The areca seed is highly astringent. This unpleasant effect, however, is neutralized by the lime in expectation.
2. Another areca quid is that in which a fresh areca is cracked up at one side of it and a small amount of areca food additive is pasted. A chop of betel fruit or betel stem is added onto it.
3. Still areca quid is first to spread a small amount of areca food additive on a piece of betel leaf. A piece of areca is wrapped inside the leaf with the areca food additive face inside.
4. The still areca quid is prepared by using a piece of areca seed in stead of the areca in method 3.
5. The still areca quid is conducted in the same way as methods 1 and 2 but without betel fruit or betel stem.

Davis reported of the relationship existing between areca quid chewing and the higher incidence of oral cancer [J.A.M.A., 64: 711-718, 1915; J. Tropical Med., 27: 274-278, 1924]. The active agent is lime of the chew.

The so-called "crude drugs", including areca, areca seed, gambir, betel leaf, betel fruit and betel stem contain a large quantity of polyphenolic compounds which are the taste of astringent and cause harm to the tissue of oral mucosa; forming a leather like compound and being associated with oral and esophageal cancer and other diseases [Bhide et al.,1984; Publication No.57; IARC,1984, pp 851857; Brunneman et al, 1985 J. Agric, Food chem. 1985,vol. 33, 1178-1181]. The efficiency of lime is very poor even though people use lime to improve the effects of polyphenolic compounds. The high alkaline property of lime, in addition to that, also produces many bad results, such as:

1. The lime in areca food additive makes the pH value of higher than 12.5, which would corrode the oral mucosa of chewer. The part corroded by lime would tan when the release of polyphenolic compounds existed from the crude drug during chewing and could not completely react with lime at the moment of release. Leathering or induce oral cancer would consequently occur;
2. The bad odor of lime is uncomfortable;
3. The teeth of the areca quid chewer are damaged by the high alkaline lime, which cannot stand the heat, acidity and rapid change of temperature. The foods belong to these conditions which are not enjoyable for areca quid chewer;
4. The spitting of the bright red chewing juice is one of the environmental pollution in society;
5. Swallowing a great amount of lime reduces the acidity of stomach and increases the chance of cancer occurring.

Many methods proposed for improving the bad effects of areca food additive currently exist, such as those being disclosed in the patent gazette No. 7010610 and No. 7112377 of Taiwan R.O.C. Those methods did not use lime and gambir. The problems caused by the polyphenolic compounds still remain, although the problem of the bright red juice could be improved. It has been noted that a series of eatable neutral calcium salts; and compounds containing at least one of the following functional groups selected from the group consisting of —NH2,=NH,≡N,—NH—,—CONH—, —HCO—,—CO—,—COOR—,—S—, and their salts; especially, protein, derivatives of protein and food containing protein; show excellent properties in comparison with lime. Accordingly, in accordance with the present invention it has been realized that the astringent, tastes and harms caused by the polyphenolic compounds of areca quid could be improved through the use of such materials in a manner that the disease of quid chewer could be decreased and the problem of environmental pollution could be improved completely.

BRIEF SUMMARY OF THE INVENTION

1. Accordingly, it is therefore a general object of the invention to provide a novel composition of areca food additive which dose not contain lime;
2. It is an object of the present invention to provide a new method of preparing areca food additive which would use neutral calcium salt to react with the polyphenolic compounds contained in crude drugs—instead of reacting with a high alkaline lime which causes many diseases to the areca quid chewer;
3. Another object of the present invention is to provide a novel composition of areca food additive comprising crude drug, compound containing at least one of the functional group selected from the group consisting of —NH2,=NH,≡N,—NH—,—CONH—,—HCO—, —CO—,—COOR—,—S—, and their salts; especially, protein, derivatives of protein and food containing protein; and modifier selected from the group of sweetener, perfume, preserver, stabilizer, color pigment, Chinese herbs and fillers;
4. A still more specific object of the present invention is to provide a novel areca quid which uses eatable neutral calcium salts of organic acids. Reacting with the polyphenolic compounds of crude drugs, instead of high alkaline lime, is the goal;
5. Yet another object of the present invention is to accordingly provide a novel method for preparation of areca quid which uses food contain functional group selected from the group consisting of NH2,=NH,≡N, —NH—,—CONH—,—HCO—,—CO—,—COOR—,—S—, and their salts; especially, protein, derivatives of protein and food containing protein; this would be in order to react with the polyphenolic compounds of crude drugs instead of high alkaline lime;

6. Still another object of the present invention is to provide novel foods, such as beverages, biscuits, candy, cake, chewing gum, and throat lozenges all of which would contain the areca or the component of areca;

7. A general object of this invention is to provide areca quid which are eatable and will improve the environmental pollution caused by the spitting of a bright red juice.

Other and further objects, features and advantages of the invention will appear more from the following description.

DETAILED DESCRIPTION

A series of eatable compounds for preparation areca food additive, which have an excellent effect for reaction with polyphenolic compounds, has been devised by the inventor. This series of eatable compounds is superior to the traditional lime compound and could improve all the present disadvantages in areca food.

The eatable foods include; salts of calcium organic acid, such as calcium formate, calcium fumarate, calcium glautamete, calcium glycerophosphate, calcium lactate, calcium malate, calcium maleate, calcium succinate, calcium tartrate, calcium citrate and calcium glutamate; food which contains at least one of the following functional groups selected from the group consisting of $-NH_2, =NH, \equiv N, -NH-, -CONH-, -H-CO-, -CO-, -COOR-, -S-$, and their salts; particularly, protein, hydrolyzed products of protein and foods containing protein.

Specific examples which contain the functional group selected from the group consisting of $-NH_2, =N-H, \equiv N, -NH-, -CONH-, -HCO-, -CO-, -COOR-, -S-$ are pure proteins, such as hemialbumin, albumin, histone, gelatin, protamine, albuminoid; complex proteins, such as nucleoproteid, glycoproteid, phosphoproteid and liporoteid; derivative proteins, such as m-protein and peptone; hydrolyzed protein, such as gelatine, polypeptide and amino acid; and their mixture compounds.

The special examples which contain $-CONH-$ group are fibroin, keratin, and low molecule weight of nylon. The special examples which contain $-H-CO-, -CO-$ are reducing compounds, such as rhamnose, galactose and lactose. The special examples contain $-COOR-$ are synthetic polyethers, such as methly cellulose, Tweens, and poly-N-vinyl-pyrolidine.

Most of the compounds previously mentioned could be produced from foods, including foods of vegetable and animal. These the foods, especially those containing protein or amino acids, show good properties for reaction of polyphenolic compounds. The properties are based on the quantity of protein and/or amino acid of which they are borne. These discoverings are very useful to this invention. The vegetables including various kind of grain foods, seeds, and their products, such as soy bean, green bean, azuki bean, peanut, germs, soy bean crude, sesame seed, hemp seed, natto, kidney bean, radish, walnut; and animal foods, such as milk, sea foods, egg, tissues of animals, yeast, meat all belong to food.

The compounds for the areca food additive would be better in a state of fine particle in order for an effect of reaction.

The modifier to be used in areca food additive is selected from the group consisting of sweeteners, perfumes, preservers, stabilizers, color pigments, herbs and fillers. They are compounds of sweeteners such as honey, maltose, sugar, fructose, glycyrrhizin, saccrin, d-sorbital and d-mannitol; perfumes, such as mint and essential oils; preservatives, such as benzoate, sodium benzoate, calcium propinate, sorbitar, dehydroacetic acid and its salts, sorbic acid; stabilizers, such as CMC, pectin, arabic gum, and locust bean gum; color pigment, such as chlorophyll and green No.1; Chinese herbs, such as licorice root, cinnamon, coffee and cocoa. They are used in a favorable amount and according to the food regulations.

The compounds and their amounts for the requirement of reaction with polyphenolic compounds of areca quid are not strictly confined to one kind of compounds and a specific amount. They, however, depend on the quantity of total polyphenolic compounds contained. The equivalent of chemical reaction is usually greater than the equivalent of polyphenolic compounds. The composition of crude drug depends on the season of their harvests and the degree of reap. Their content of polyphenolic compounds then varies over a wide range.

$7 \sim 33\%$ of d-catechin and $22 \sim 50\%$ of gambir tanning contained gambir exist. The seed of area bears approximately 40% of the polyphenolic compounds in green and is reduced to approximately 20% after ripening. The fruit of areca has only $2 \sim 8\%$. The stem, fruit and leaf of areca betel, respectively, bears $2 \sim 5\%$, $1 \sim 3\%$ and $1 \sim 2\%$ in weight of polyphenolic compounds.

The preparation method of areca food is not limited to using fresh crude drugs. That method also uses the crude drugs which can be grounded into powder or into a state of paste; can be extracted for components by water or organic solvents, such as hexane, alcohol and ether, to remove the fibre; and can be separated the effective components from the extracts.

The areca food additive may be in the form of paste, powder in package, solid produced from drying the paste, and in liquid.

The areca food additive compounds with foods and other crude drugs, stabilizers, pigments, preservative agents, perfumes and sweeteners in the proper quantity in order to form a state of chewing gum, cake, biscuits, lozengers, beverages or candy. That is good for packing and storage.

The invention will be understood more readily with reference to the following examples. These examples, however, are intended to illustrate the invention and are not be meant to limit the scope of the invention.

Traditional art examples 1

After dissolving 0.04 g of pictin in 14 g of water, 0.02 g of benzoic acid, 0.4 g of cinnamon, 10 g of hone), and 8 g of gambir are added into the solution, and pasted by homogenizer to form a areca food additive.

Traditional art example 2

The same example as traditional art example 1, except 8 g of lime, is compounded in it.

Traditional example 3

The same example as traditional art example 1, except 10 g of calcium carbonate, is compound in it.

EXAMPLE 1

The same example as traditional art example 1, except 12 g of casein powder, is compounded in it.

EXAMPLE 2

After dissolving 0.08 g of arabic gum in 30 g of water, 0,006 g of benzoic acid, 0.02 g apple essence, I g of sugar and 24 g of radish powder are added into the solution in turn, and pasted by a homogenizer to form a areca food additive.

EXAMPLE 3

After dissolving 0.08 g locust bean in 30 g of water, 0.2 g of sodium propinate, 0.02 g of peppermint, 12 g of molasses and 12 g soybean lees powder are added into the solution in turn, and pasted by a homogenizer to form a areca food additive.

EXAMPLE 4

After dissolving 0.04 g of ester of p-hydroxybenzoic acid in 16 g of water, 0.2 g of D-mantol, 8 g of gambir and 14 g of glutathione are added into the solution, and pasted by a homogenizer in order to form a areca food additive.

EXAMPLE 5

2 g of Aspartame, 10 g of m-protein and 8 g of water are pasted by a homogenizer to form a areca food additive.

EXAMPLE 6

20 g of water, 6 g of gambir, 8 g of soybean powder and 8 g of soybean lees powder are pasted by a homogenizer in order to form a areca food additive.

EXAMPLE 7

40 g of bean paste, 10 g of rice bran, 8 g of soybean lees powder and 0.08 g of DHA(dehydroacetic acid) are pasted by a homogenizer in order to form a areca food additive.

EXAMPLE 8

60 g of fermented bean curd are pasted by a homogenizer in order to form a areca food additive.

EXAMPLE 9

60 g of fermented bean curd, 20 g of sugared bean and 8 g of coffee powder are pasted by a homogenizer in order to form a areca food additive.

EXAMPLE 10

16 g of honey and 20 g green bean are pasted by a homogenizer in order to form a areca food additive.

EXAMPLE 11

After dissolving 0.04 g of DHA in 20 g of water, 6 g of honey, 6 g of lave and 16 g milk powder are pasted by a homogenizer in order to form a areca food additive.

EXAMPLE 12

After dissolving 6 g of gelatine in 40 g of water, 0.8 g alcohol, 0.2 g of cinnamon, 10 g of gambir and 8 g of fish powder are pasted by a homogenizer to form a areca food additive.

EXAMPLE 13

2 g of Aspartame and 20 g of calcium glycerophosphate are pasted in 20 g of water by a homogenizer in order to form a areca food additive.

Experimental testing 1

All the pastes of areca food additives products made in traditional art examples from 1 to 3. Examples from 1 to 13 are respectively divided into 20 equal parts.

Each kind of pastes 4 parts are respectively, as previously done, into a 100 ml beaker. A volume of 70 ml of water is added into each beaker and mixed with a mixer for 10 minutes. The mixture is filtered and the color of solution is recorded. The free amount of polyphenolic compounds are analyzed and the results are shown in Table 1.

TABLE 1

| Item | color of solution | amount of polyphenol | Item | color of solution | amount of polyhenol |
| --- | --- | --- | --- | --- | --- |
| Trad. Exam. 1 | Bright red | much | Example 6 | Light | none |
| Trad. Exam. 1 | Bright red | much | Example 7 | Light | none |
| Trad. Exam. 1 | Bright red | much | Example 8 | Light | none |
| Example 1 | Light | none | Example 9 | Light | none |
| Example 2 | Light | none | Example 10 | Light | none |
| Example 3 | Light | none | Example 11 | Light | none |
| Example 4 | Light | none | Example 12 | Light | none |
| Example 5 | Light | none | Example 13 | Light | none |

The color of solutions made from the invention are obviously all not shown in a bright red color like those of the traditional art examples. No free polyphenolic compounds being detected from the solutions of the invention existed.

Traditional art example 4

15 pieces of Taiwan areca, the average weight being 4 g, are cracked from longitudinal side in half way. Put one part of paste of areca food additive made from traditional art example 1 in the crack, and a chop of betel fruit is mounted on the paste, respectively.

Traditional Art Example 5

The same as traditional art example 5, except for the paste of areca food additive, is done by using the one made from traditional art example 2.

Traditional Art Example 6

The same as traditional art example 4, except for the paste areca food additive, is done by using the one made from traditional art example 3.

EXAMPLE 14

The same as traditional art example 4 except the paste of areca food additive is using the one made from example 1.

EXAMPLE 15

15 pieces of betel leave, which have an average weight of 2.8 g, are spread one part of pastes from an areca food additive made from an example on the up side and wrapped up a piece of Taiwan areca of approximately 4 g weight, respectively, to form an areca quid.

EXAMPLE 16

The paste made from example 3 is mixed with 10 g of tobacco and is divided into 20 parts. 15 pieces of Taiwan betel leave, having an average weight of 2.8 g, are spread with one part of pastes of areca food additive as previously made, and a piece of Taiwan areca is respectively wrapped up in order to produce areca quids.

EXAMPLE 17

15 pieces of Taiwan areca, having an average weight of 8 g, are cracked from a longitudinal side in a half way. One part of paste of areca food additive made from example 4 is put in the crack. A chop of 0.7 g of betel fruit is respectively added onto it. The areca quids are then produced.

EXAMPLE 18

The same as example 17, except the average weight of areca is 4 g and the pastes of areca food additive are using the ones made from example 5.

EXAMPLE 19

The same as example 18, except the pastes of areca food additive are made from example 6.

EXAMPLE 20

The same as example 15, except the average weight of betel leave is 2.1 g and the paste of areca food additive is made from example 7.

EXAMPLE 21

The same as example 20, except an average weight of 1.5 g of Taiwan areca seed is instead of betel fruit, and the paste of areca food additive is made from example 8.

EXAMPLE 22

The same as example 17, except the average weight of areca is 4.2 g, and 0.3 g of betel stem instead of the betel fruit and the paste of areca food additive is made from example 9.

EXAMPLE 23

The same as example 18, except the average weight of areca is 4.1 g, the paste of areca food additive is made from example 11 and the betel fruit is 1.5 g instead.

EXAMPLE 24

The same as example 17, except the average weight of areca is 8.1 g, the paste of areca food additive is made from example 12 and the betel fruit is 1 g.

Experimental Testing 2

Taking 15 pieces of product out of each of the comparison, examples from 4 to 6 and examples from 14 to 24, are crushed by crush the machine and 200 ml of water is respectively added into a 300 ml beaker mixing for 10 minutes. The procedure as described in experimental testing 1 is to be followed with the results being shown in Table 2.

TABLE 2

| Item | color of solution | amount of polyphenol | Item | color of solution | amount of polyphenol |
| --- | --- | --- | --- | --- | --- |
| Trad. Exam. 4 | Bright red | much | Example 18 | Light | none |
| Trad. Exam. 5 | Bright red | much | Example 19 | Light | none |

TABLE 2-continued

| Item | color of solution | amount of polyphenol | Item | color of solution | amount of polyhenol |
| --- | --- | --- | --- | --- | --- |
| Trad. Exam. 6 | Bright red | much | Example 20 | Light | none |
| Example 14 | Light | none | Example 21 | Light | none |
| Example 15 | Light | none | Example 22 | Light | none |
| Example 16 | Light | none | Example 23 | Light | none |
| Example 17 | Light | none | Example 24 | Light | none |

The products made by present invention are obviously similar to results as shown in experimental testing 1. The traditional ones are, meanwhile, shown in bright red in the solution with much of the free polyphenolic compounds having remained.

Experimental Testing 3

The taste testings are performed by distribution of one piece of 5 quids as produced from each of traditional art examples from 4 to 6 and examples from 14 to 24, to one of 5 persons for chewing, respectively. The color of chewing liquid and taste are recorded. The results are shown in Table 3.

TABLE 3

| Item | color of solution | taste of chewing | Item | color of solution | taste of chewing |
| --- | --- | --- | --- | --- | --- |
| Trad. Exam. 4 | Bright red | astringent | Example 18 | Light | good |
| Trad. Exam. 5 | Bright red | astringent | Example 19 | Light | good |
| Trad. Exam. 6 | Bright red | astringent | Example 20 | Light | good |
| Example 14 | Light | good | Example 21 | Light | good |
| Example 15 | Light | good | Example 22 | Light | good |
| Example 16 | Light | good | Example 23 | Light | good |
| Example 17 | Light | good | Example 24 | Light | good |

EXAMPLE 25

80 pieces of areca quit made from example 23 are crushed, dried and grounded into powder. 130 g of chicle gum, 215 g of powder sugar and 25 g of malt are molten and mixed in a pot.

The prepared dry powder is added to the molted compound 1 g of mint. After mixing, rolling, extruding, and cutting, a chewing gum product with a size of 2×7.5×2 cm is finally manufactured.

EXAMPLE 26

50 pieces of areca quid made from example 19 are crushed and grounded. They are then added into a pot where a transparent molten product exists, which is made from dissolving 6 g of starch, 100 g of sugar, 100 g of malt and 30 g of water, and mixed at 100°~105° C.

At the conditions of concentration at 90% and temperature at 110° C., 15 g of butter is added, and the operation of heating and mixing is continued. When the temperature of product reaches 120° C., the betel product is slowly added. The mixing is then speeded up, at 110° C., until the water content reaches at 8%. The candy containing areca is then produced by steps of pulling, rolling, cutting and packing.

EXAMPLE b 27

35 g of sugar, 6 g of millet jelly and 1 g of sodium alginate are dissolved into a 310 g of milk at 60° C. 35 g of powder areca are added, homogenized, packed in a can, and, finally, heat treated at 105° C. for 20 minutes. The drink containing areca component is made.

EXAMPLE 28

30 g of areca seed are crushed and grounded into mud. It is then added into a pot where 200 g of egg are splashed by an egg mixer. The 20 g of power sugar and 1 g of lemon essence are added. Mixing continues for awhile, with 50 g of wheat powder and 50 g of starch being added and mixed. The resulting mass is formed into a size of thick 5 mm, length 4 cm and width 5 cm on a oven plate where a layer of salad oil is spread. A little milk is sprayed on it, and baked at 190° C. for 20 minutes in order to manufacture a biscuits containing areca component.

EXAMPLE 29

400 g areca are crushed, being extracted with 500 g of water at 90° C. for 20 minutes. 30 g of soybean lees is added. The solution is filtered after mixing for 10 minutes.

10 g of alcohol, 180 g of sugar, 120 g of glucose, 2 g of phosphoric acid, 0.8 g of lemon essence and 3000 g water are mixed with the filtrate.

The resulting solution is degassed and filled with $CO_2$ gas at the conditions of 40° C. and at 70 lb pressure with a carbonator. It is then packed into a 250 ml bottle and capped.

Experimental Testing 4

The products produced from Examples from 25 to 29 are respectively tasted by a group of 5 persons for each food.

The products are all shown to be non astringent and good tasting and the people feel well feeling.

The form of this invention herein shown and described is understood to be taken as a preferred example of the same. Various changes in the shape, size and arrangement of parts may be resorted to without departing from the spirit of this invention or the scope of the subjoined claims.

What is claimed is:

1. Areca quid comprising:
   one of areca and areca seed;
   areca food additive means for reacting with and completely neutralizing polyphenolic compounds included in said areca and areca seed; and
   alternatively a component selected from the group consisting of betel leave, betel fruit, Chinese herb, and betel stem.

2. A food comprising: areca and an areca food additive in a state of homogeneity, said areca food additive containing a component selected from the group consisting of a calcium salt and a proteinaceous material which reacts with polyphenolic compounds.

3. Food comprising: a homogenized areca component in which polyphenolic compounds of said areca component have been removed by treatment with an areca food additive.

4. A method of producing food containing a polyphenolic free areca component comprising the steps of:
   mixing and homogenizing a component of areca and an areca food additive; and
   reacting polyphenolic compounds contained in said areca component with a component contained in said areca food additive.

5. A food as claimed in claim 2, wherein said areca component is selected from a group consisting of powder of areca, powder of areca seed, paste of areca, paste of areca seed, extracts of areca or areca seed by water or organic solvent, and the effective compound separated from the extracts.

6. A food as claimed in claim 2, wherein the food comprises one of the group consisting of candy, cake, biscuits, chewing gum, beverages and lozenges.

7. A food as claimed in claim 3, wherein the areca component is selected from a group consisting of powder of seed, paste of areca, paste of areca seed, extracts of areca or areca seed by water or organic solvent, and the effective compound separated from the extracts.

8. A method as claimed in claim 4, wherein the areca component is selected from a group consisting of powder of areca seed, paste of areca, paste of areca seed, extracts of areca or areca seed by water or organic solvent, and the effective compound separated from the extracts.

9. The food claimed in claim 3, wherein the food containing areca component is selected from the group consisting of candy, cake, biscuits, chewing gum, beverages and lozenges.

10. The food as claimed in claim 4, wherein the food containing areca component is selected from the group consisting of candy, cake, biscuits, chewing gum, beverages and lozenges.

* * * * *